US005151604A

United States Patent [19]

Kohda et al.

[11] Patent Number: 5,151,604

[45] Date of Patent: Sep. 29, 1992

[54] RADIATION IMAGE STORAGE PANEL

[75] Inventors: Katsuhiro Kohda; Terumi Matsuda, both of Kanagawa, Japan

[73] Assignee: Fuji Photo Film Co., Ltd., Kanagawa, Japan

[21] Appl. No.: 688,271

[22] Filed: Apr. 22, 1991

[30] Foreign Application Priority Data

Apr. 20, 1990 [JP] Japan .................................. 2-104470

[51] Int. Cl.[5] .................................................. B32B 5/16
[52] U.S. Cl. .................................. 250/484.1; 430/139
[58] Field of Search .......................... 250/484.1, 327.2; 430/139

[56] References Cited

U.S. PATENT DOCUMENTS

| | | | |
|---|---|---|---|
| 4,628,208 | 12/1986 | Arakawa | 250/484.1 |
| 4,645,721 | 2/1987 | Arakawa et al. | 250/327.2 |
| 4,845,369 | 7/1989 | Arakawa et al. | 250/484.1 |
| 4,855,191 | 8/1989 | Arakawa et al. | 250/483.1 |
| 4,977,327 | 12/1990 | Arakawa et al. | 250/484.1 |

*Primary Examiner*—Carolyn E. Fields
*Assistant Examiner*—Drew A. Dunn
*Attorney, Agent, or Firm*—Sixbey, Friedman, Leedom & Ferguson

[57] ABSTRACT

A radiation image storage panel comprises a support made of a plastic film or a paper material, a stimulable phosphor layer and optionally one or more other layers. The radiation image storage panel contains an electroconductive zinc oxide whisker in at least one layer.

5 Claims, 4 Drawing Sheets

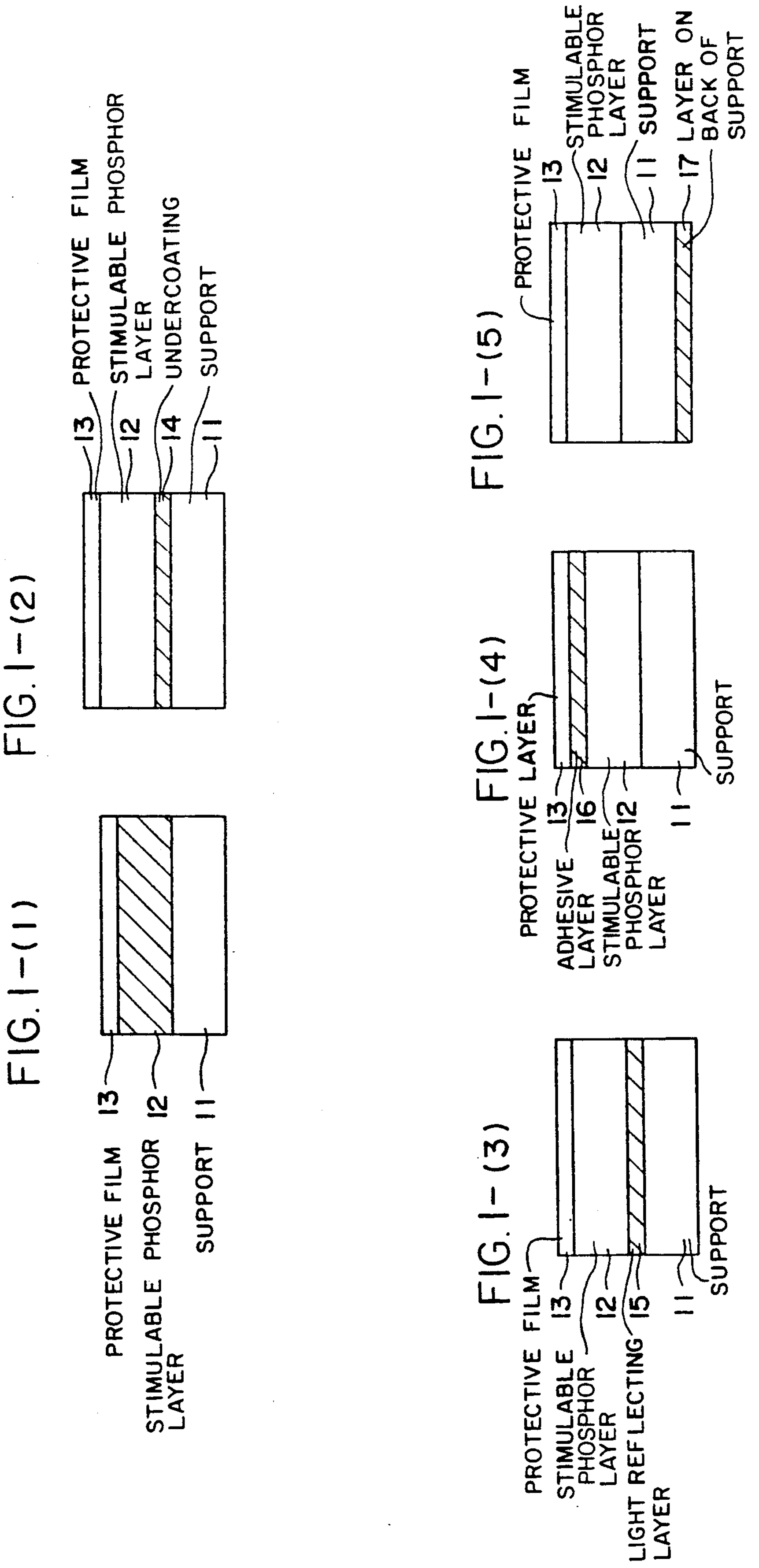
FIG. 1-(1)
PROTECTIVE FILM 13
STIMULABLE PHOSPHOR LAYER 12
SUPPORT 11
FIG. 1-(2)
13 PROTECTIVE FILM
12 STIMULABLE PHOSPHOR LAYER
14 UNDERCOATING
11 SUPPORT
FIG. 1-(3)
PROTECTIVE FILM 13
STIMULABLE PHOSPHOR LAYER 12
LIGHT REFLECTING LAYER 15
11 SUPPORT
FIG. 1-(4)
PROTECTIVE LAYER 13
ADHESIVE LAYER 16
STIMULABLE PHOSPHOR LAYER 12
11 SUPPORT
FIG. 1-(5)
PROTECTIVE FILM 13
12 STIMULABLE PHOSPHOR LAYER
11 SUPPORT
17 LAYER ON BACK OF SUPPORT F/G. 2
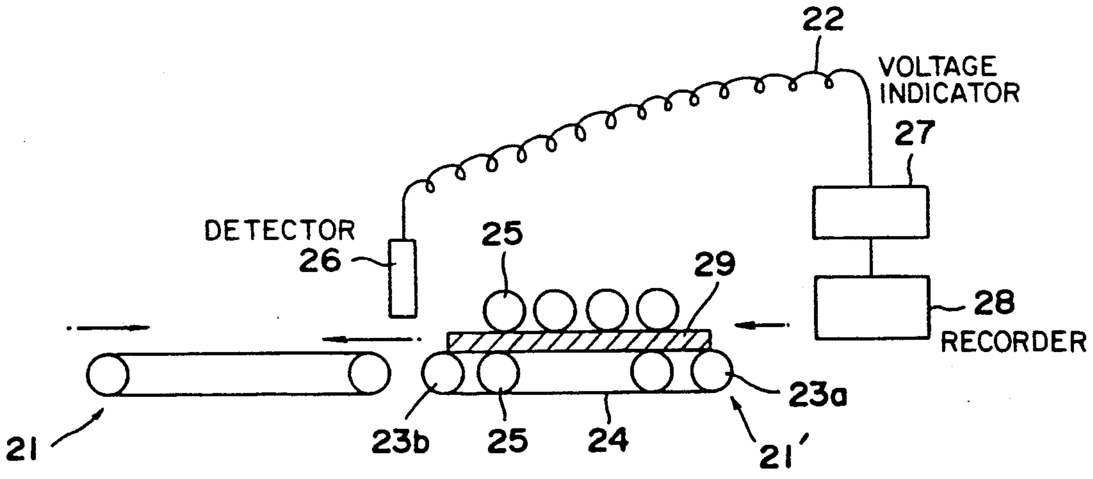

RADIATION IMAGE STORAGE PANEL

BACKGROUND OF THE INVENTION

1. Field of Invention

The present invention relates to a radiation image storage panel employed in a radiation image recording and reproducing method utilizing a stimulable phosphor.

2. Description of Prior Art

As a method replacing a conventional radiography, a radiation image recording and reproducing method utilizing a stimulable phosphor as described, for instance, in U.S. Pat. No. 4,239,968, is known. In this method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with that of the conventional radiography. Accordingly, this method is of great value especially when the method is used for medical diagnosis.

The radiation image storage panel employed in the radiation image recording and reproducing method basically comprises a support and a stimulable phosphor layer provided thereon. Further, a transparent film is generally provided on the free surface of the phosphor layer (surface not facing the support) to keep the phosphor layer from chemical deterioration and physical shock.

The stimulable phosphor layer generally comprises a binder and stimulable phosphor particles dispersed therein. However, the stimulable phosphor layer can be in the form of a layer made by vapor-deposition or a sintered layer. The stimulable phosphor emits light (gives stimulated emission) when excited with an electromagnetic wave (i.e., stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very advantageous for obtaining a visible image as described above, and the storage panel used in the method is desired to have high sensitivity and provide an image of high quality (high sharpness, high graininess, etc.).

In performing the radiation image recording and reproducing method, the radiation image storage panel is repeatedly used in a cyclic procedure comprising the steps of: exposing the panel to a radiation (recording radiation image thereon), irradiating the panel with stimulating rays (reading out the recorded radiation image therefrom) and irradiating the panel with a light for erasure (erasing the remaining radiation image from the panel). The panel is transferred from a step to the subsequent step in a transfer system in such a manner that the panel is sandwiched between transferring members (e.g., rolls and endless belt) of the system, and piled on other panel to be stored after one cycle is completed.

The repeated use of the storage panel comprising transferring and piling causes physical contacts such as a friction between the surface of the panel (surface of the phosphor layer or surface of the protective film) and a surface of other panel (surface of the support), friction between edges of the panel and a surface of other panel, and a friction between the panel and transferring members (e.g., roll and belt).

As a support material of the radiation image storage panel, desirably employed are plastic films (i.e., polymer films) such as a polyethylene terephthalate film and one of various papers (coated or uncoated) from the viewpoint of flexibility required in the transferring procedure of the panel.

However, the panel having a support made of a polymer material or a paper is apt to be electrostatically charged on its surface owing to the repeated physical contact encountering in the transferring procedure. In more detail, the surface (front surface) of the panel is apt to be negatively charged, and other surface (back surface) is apt to be positively charged. This static electrification causes various problems in the practical operation of the radiation image recording and reproducing method.

For example, when the surface of the panel is electrostatically charged, the surface of the panel easily adheres to a surface of other panel and thus adhering panels hardly separate from each other, for instance, in the vertical direction against the panel surface. In that case, the panels are transferred together in the form of a composite, from the piling position into the transfer system, whereby the subsequent procedure cannot be normally conducted.

In addition, the read-out procedure of the panel is generally carried out by irradiating the panel with stimulating rays from the phosphor layer-side surface of the panel, and in this procedure, the charged surface of the panel is likely to be deposited with dust in air, so that the stimulating rays are scattered on the dust deposited on the charged surface and quality of the resulting image lowers. Moreover, the storage panel decreases in the sensitivity or the resulting image provided by the panel suffers noise such as static mark when discharge takes place, and unfavorable shock is sometimes given to the operator because of the spontaneous discharge from the panel.

Japanese Patent Provisional Publication No. 62(1987)-87900 discloses a radiation image storage panel having a antistatic layer on its back side (that is, on a surface of a support on the side not facing the phosphor layer). The antistatic layer is made of an electroconductive material such as metal film, powdery metal oxide, carbon black or electroconductive organic material and shows a specific surface resistivity of not higher than $10^{11}$ ohm.

Japanese Patent Provisional Publication No. 62(1987)-174700 discloses a radiation image storage panel having a antistatic layer between the support and the phosphor layer. The antistatic layer is made of an electroconductive material such as powdery metal oxide, carbon black or an electroconductive organic material and shows a specific surface resistivity of not higher than $10^{12}$ ohm.

Japanese Patent Provisional Publication No. 63(1988)-167298 discloses a radiation image storage panel containing $K_2O.nTiO_2$ whisker at least in a portion thereof.

SUMMARY OF THE INVENTION

It is an object of the present invention to provide a radiation image storage panel which is further improved in the antistatic property.

It is another object of the invention to provide a radiation image storage panel which is almost free from occurrence of uneveness of images (such as formation of static mark) caused by static discharge from the panel, so as to give a radiation image of improved quality.

There is provided by the present invention a radiation image storage panel comprising a support made of a plastic film or a paper material and a stimulable phosphor layer, wherein an electroconductive zinc oxide whisker is contained in at least a portion of the radiation image storage panel.

The electroconductive zinc oxide whisker generally is in the form a fiber or a tetrapod, and has a bulk density of not higher than 0.3.

The average diameter of the electroconductive zinc oxide whisker is in the range of 0.3 to 3.0 μm, and the average length thereof is in the range of 3 to 150 μm. The volume specific resistance (ohm-cm) of the electroconductive zinc oxide whisker generally is 5–10.

According to the present invention, the electroconductive zinc oxide whisker is incorporated into at least a portion of the radiation image storage panel, whereby the panel can be kept from various troubles caused by static electrification on both surfaces, particularly on the read-out side surface (phosphor layer-side surface) of the panel. In more detail, in the repeated use of the panel comprising steps of transferring and piling within a radiation image recording and reproducing apparatus, there can be achieved by the invention an improvement of the transfer properties, prevention of deposit of dust onto the panel surface and an enhancement of the quality of an image provided by the panel.

Especially when the electroconductive zinc oxide whisker is contained in the dispersed form in at least one of layers constituting the panel such as a protective layer (i.e., friction-reducing layer), an undercoating layer, a light-reflecting layer, a stimulable phosphor layer and an adhesive layer to show a surface resistivity of the layer containing said electroconductive zinc oxide whisker a value of not higher than $10^{12}$ ohm, the static electrification occurring on the surface of the radiation image storage panel can be effectively reduced. The surface resistivity used herein means a surface resistivity determined under the conditions of a temperature of 23° C. and a humidity of 53% RH.

In the radiation image storage panel of the invention, various troubles caused by the static electrification occurring on the surface of the stimulable phosphor layer can be very effectively prevented owing to the electroconductive zinc oxide whisker contained in the panel. The reason is presumed as follows: lines of electric force extending towards outside of the panel from the static charge deposited on the surface of the stimulable phosphor layer is bent by the electroconductive zinc oxide whisker to advance in the inside direction (i.e., back surface direction of the panel), that is, the lines of electric force forms closed circles, and hence the surface of the stimulable phosphor layer is not apparently electrified.

The conductive material contained in the panel of the invention is in the form of whisker, while most of the conventional conductive material is in the particulate form, so that fibers of the material according to the invention are interlocked with each other to reduce the surface resistivity of the panel even in a relatively small amount. As a result, the static electrification on the surface of the panel can be effectively reduced even by using the conductive material in a smaller amount than the conventional particulate conductive material.

Accordingly, the phosphor layer-side surface of the panel is reduced in the force attracting other material which is caused by the static charge. In the radiation image recording and reproducing apparatus, a panel piled on other panels is generally separated from others by lifting it in the direction vertical to the direction of panel surface by means of a suction cup, etc. According to the invention, it is prevented that two panels are introduced into the transfer system in the combined form from the piling state to the transferring stage in the apparatus. Further, the storage panel is effectively kept from deposit of dust on the phosphor layer-side surface. Moreover, since the static discharge of the panel surface can be prominently reduced, the lowering of the sensitivity and the occurrence of noise (static mark) on an image provided by the panel are also prevented, and other adverse effects caused by the discharge such as a shock are apparently reduced.

Moreover, the layer containing the electroconductive zinc oxide whisker shows a high reflectance in the radiation image storage panel. Accordingly, the radiation image storage panel of the invention shows prominently high luminance (that is, prominently high sensitivity) at the same sharpness basis. In other words, the radiation image storage panel of the invention shows prominently high sharpness at the same sensitivity basis.

Therefore, the radiation image storage panel of the invention has favorable characteristics in the antistatic property as well as in the sensitivity and sharpness.

BRIEF DESCRIPTION OF THE DRAWINGS

FIGS. 1-(1), 1-(2), 1-(3), 1-(4) and 1-(5) are sectional views illustrating various constitutions of the radiation image storage panels according to the invention.

FIG. 2 schematically illustrates a static electricity testing device for evaluating the transfer property of a radiation image storage panel.

DETAILED DESCRIPTION OF THE INVENTION

Figure 3:
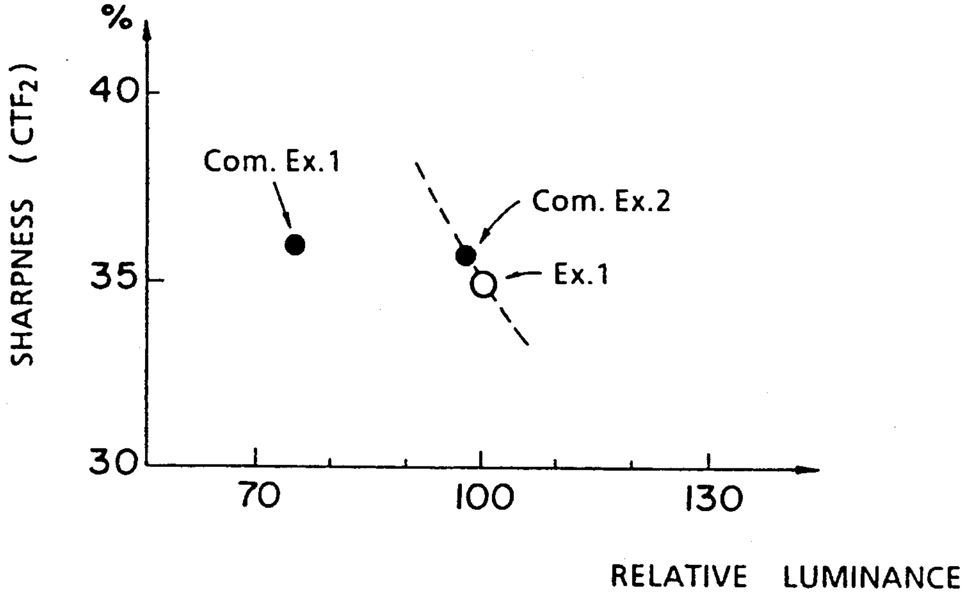
FIGS. 3, 4 and 5 are graphs illustrating relationship between a relative amount of stimulated emission (i.e., relative luminance) and sharpness of the image obtained by the tested radiation image storage panel.

The radiation image storage panel of the invention is described in detail hereinafter referring to the attached drawings.

FIGS. 1-(1), 1-(2), 1-(3), 1-(4) and 1-(5) are sectional views which show, respectively, favorable embodiments of the radiation image storage panel according to the invention.

In FIG. 1-(1), the radiation image storage panel comprises a support 11, a stimulable phosphor layer 12 and a protective film 13, superposed in order, and the electroconductive zinc oxide whisker is contained in the stimulable phosphor layer 12.

In FIG. 1-(2), an undercoating layer 14 is further provided between a support 11 and a stimulable phosphor layer 12, and the electroconductive zinc oxide whisker is contained in the undercoating layer 14.

In FIG. 1-(3), a light-reflecting layer 15 is provided between a support 11 and a stimulable phosphor layer 12, and an electroconductive zinc oxide whisker is contained in the light-reflecting layer 15.

In FIG. 1-(4), an electroconductive zinc oxide whisker is contained in an adhesive layer 16.

In FIG. 1-(5), a layer 17 made of an electroconductive zinc oxide whisker is provided on one surface (back side) of a support 11 not facing a stimulable phosphor layer 12.

The above-mentioned embodiments are given as only representative examples, and it should be understood that the radiation image storage panel of the invention is by no means restricted to the above-mentioned ones. Any other panels can be also employed in the invention, provided that the panel comprises at least a support and a stimulable phosphor layer and the electroconductive zinc oxide whisker is contained in any layer or layers constituting the panel. For example, the electroconductive zinc oxide whisker can be contained in a support or a protective film. Otherwise, a thin layer composed of the electroconductive zinc oxide whisker can be placed on the phosphor layer-side surface of the panel or between optional layers of the storage panel.

The radiation image storage panel can be prepared, for example, by the following process.

Examples of the support material employable in the radiation image storage panel of the invention include plastic films such as films of cellulose acetate, polyester, polyethylene terephthalate, polyamide, polyimide, triacetate and polycarbonate; and various papers such as ordinary paper, baryta paper, resin-coated paper, pigment papers containing titanium dioxide or the like and papers sized with a sizing agent such as polyvinyl alcohol. From the viewpoint of characteristics of a radiation image recording material and handling thereof, a plastic film is preferably employed as the support material in the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

On the surface of the support where a stimulable phosphor layer is to be coated may be provided a light-reflecting layer to improve the sensitivity of the panel.

The light-reflecting layer comprises a binder and a light-reflecting material dispersed therein.

Examples of the light-reflecting materials employable in the invention include white pigments such as $Al_2O_3$, $ZrO_2$, $TiO_2$, $BaSO_4$, $SiO_2$, ZnS, ZnO, MgO, $CaCO_3$, $Sb_2O_3$, $Nb_2O_5$, $2PbCO_2$, $Pb(OH)_2$, $M^{II}FX$ (in which $M^{II}$ is at least one of Ba, Ca and Sr, and X is Cl or Br), lithopone ($BaSO_4$+ZnS), magnesium silicate, basic silicon sulfate white lead, basic phosphate lead and aluminum silicate; and polymer particles (polymer pigments) of hollow structure. A hollow polymer particle is composed for example of a styrene polymer or a styrene/acrylic copolymer, and has an outer diameter ranging from 0.2 to 1 μm and an inner diameter ranging from 0.05 to 0.7 μm.

The light-reflecting layer can be formed on the support by well mixing the light-reflecting material and a binder in an appropriate solvent to prepare a coating solution (dispersion) homogeneously containing the light-reflecting material in the binder solution, coating the solution over the surface of the support to give a coated layer of the solution, and drying the coated layer under heating.

The binder and solvents for the light-reflecting layer can be selected from those used in the preparation of a stimulable phosphor layer which will be described hereinafter. In the case of using hollow polymer particles as the light-reflecting material, a hydrophilic polymer material such as an acrylic acid polymer can be used as the binder. The coating solution for the preparation of the light-reflecting layer may further contain any of a variety of additives contained in a coating dispersion for a phosphor layer (also described hereinafter) such as a dispersing agent, a plasticizer and a colorant.

A ratio of amount between the binder and the light-reflecting layer in the coating solution is generally in the range of 1:1 to 1:50 (binder: light-reflecting material, by weight), preferably in the range of 1:2 to 1:20. The thickness of the light-reflecting layer is preferably in the range of 5 to 100 μm.

The light-reflecting layer may contain the electroconductive zinc oxide whisker.

The electroconductive zinc ozide whisker is added to the solvent as well as the light-reflecting material in the preparation of a coating solution, and the obtained coating solution is treated in the same manner as stated above to give a light-reflecting layer. The amount of the electroconductive zinc oxide whisker to be contained in the light-reflecting layer varies depending on the amount of the light-reflecting material, the thickness of the light-reflecting layer, etc. Generally, the amount of the electroconductive zinc oxide whisker is in the range of 1 to 50% by weight, preferably 5 to 20% by weight, based on the amount of the light-reflecting material.

The light-reflecting layer containing the electroconductive zinc oxide whisker preferably has a surface resistivity of not higher than $10^{12}$ ohm. The surface resistivity used herein means a value determined under the conditions of a temperature of 23° C. and a humidity of 53% RH as described before.

On the surface of the support may be provided an undercoating layer to enhance the adhesion between the support and the stimulable phosphor layer.

Examples of the materials of the undercoating layer employable in the invention include resins such as polyacrylic resins, polyester resins, polyurethane resins, polyvinyl acetate resins and ethylene/vinyl acetate copolymers. However, those resins are given by no means to restrict resins employable in the invention. For example, other resins which are optionally used for the conventional undercoating layers can be also employed in the invention. Further, the resin for the undercoating layer may be crosslinked with a crosslinking agent such as aliphatic isocyanate, aromatic isocyanate, melamine, amino resin and their derivatives.

The formation of the undercoating layer on the support can be conducted by dissolving the above-mentioned resin in an appropriate solvent to prepare a coating solution, uniformly and evenly coating the solution over the surface of the support by a conventional coating method to give a coated layer, and then heating the coated layer slowly to dryness. The solvent for the coating solution of the undercoating layer can be selected from those used in the preparation of a stimulable phosphor layer which will be described hereinafter. The thickness of the undercoating layer preferably ranges from 3 to 50 μm.

The undercoating layer can contain the electroconductive zinc oxide whisker according to the invention. In this case, the electroconductive zinc oxide whisker is added to the solvent as well as the above-mentioned resin to prepare a coating solution for an undercoating layer. Using the obtained coating solution, an undercoating layer is formed on the support in the same manner as described above. The amount of the electroconductive zinc oxide whisker to be contained in the undercoating layer varies depending on the thickness of the undercoating layer, etc. Generally, the amount thereof is in the range of 1 to 50% by weight, preferably in the range of 5 to 20% by weight, based on the amount of the resin.

The undercoating layer containing the electroconductive zinc oxide whisker preferably has a surface resistivity of not higher than $10^{12}$ ohm from the viewpoint of antistatic property. When the surface resistivity of the undercoating layer is excessively low, the resulting panel piled on other panel is hardly moved in the direction of panel surface because the apparent friction between the two panels becomes large, or the edge portion of the panel is readily charged or discharged to give shocks to a human body when the edge of the panel is brought into contact with the human body. Accordingly, the surface resistivity of the undercoating layer preferably is not lower than $10^{10}$ ohm from the viewpoints of easy separation between piled panels and prevention of shocks caused by the static charge or discharge.

In the invention, the electroconductive zinc oxide whisker is preferably contained (dispersed) in the undercoating layer from the viewpoints of the antistatic effect, easiness of manufacturing, etc.

The phosphor layer-side surface of the support (or the surface of a light-reflecting layer or an undercoating layer in the case that such layers are provided on the phosphor layer) may be provided with protruded and depressed portions for enhancement of the sharpness of the image.

Subsequently, on the support (or on the light-reflecting layer, or on the undercoating layer) is formed a stimulable phosphor layer. The stimulable phosphor layer basically comprises a binder and stimulable phosphor particles dispersed therein. The stimulable phosphor particles, as described hereinbefore, give stimulated emission when excited with stimulating rays after exposure to a radiation. From the viewpoint of practical use, the stimulable phosphor is desired to emit light in the wavelength region of 300–500 nm when excited with stimulating rays in the wavelength region of 400–900 nm.

Examples of the stimulable phosphor employable in the panel of the invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO{\cdot}xAl_2O_3$:Eu, in which x is a number satisfying the condition of $0.8 \leqq x \leqq 10$, and $M^{2+}O{\cdot}xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as stated in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX{\cdot}xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0 < y \leqq 0.2$, respectively;

$(Ba_{1-x},M^{II}_x)F_2{\cdot}aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 10^{-2}$, respectively;

$(Ba_{1-x},M^{II}_x)F_2{\cdot}aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 2 \times 10^{-1}$, respectively;

$(Ba_{1-x},M^{II}_x)F_2{\cdot}aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 5 \times 10^{-1}$;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2}\leqq x\leqq 0.5$ and $0<y\leqq 0.1$, respectively;

$BaFX\cdot xA:yEu^{2+}$, in which X is at least one halogen selected from the group consisting of Cl, Br and I; A is at least one fired product of a tetrafluoroboric acid compound; and x and y are numbers satisfying the conditions of $10^{-6}\leqq x\leqq 0.1$ and $0<y\leqq 0.1$, respectively;

$BaFX\cdot xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6}\leqq x\leqq 0.1$ and $0<y\leqq 0.1$, respectively;

$BaFX\cdot xNaX':aEu^{2+}$, in which each of X and X' is at least one halogen selected from the group consisting of Cl, Br and I; and x and a are numbers satisfying the conditions of $0<x\leqq 2$ and $0<a\leqq 0.2$, respectively;

$M^{II}FX\cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leqq 2$, $0<y\leqq 0.2$ and $0<z\leqq 10^{-2}$, respectively;

$M^{II}FX\cdot aM^{I}X'\cdot bM'^{II}X''_2\cdot cM^{III}X'''_3\cdot xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0\leqq a\leqq 2$, $0\leqq b\leqq 10^{-2}$, $0\leqq c\leqq 10^{-2}$ and $a+b+c\geqq 10^{-6}$; and x and y are numbers satisfying the conditions of $0<x\leqq 0.5$ and $0<y\leqq 0.2$, respectively;

$M^{II}X_2\cdot aM^{II}X'_2$: $xEu^{2+}$, in which $M^{II}$ is at least one alkaline earth metal selected from the group consisting of Ba, Sr and Ca; each of X and X' is at least one halogen selected from the group consisting of Cl, Br and I, and $X\neq X'$; and a and x are numbers satisfying the conditions of $0.1\leqq a\leqq 10.0$ and $0<x\leqq 0.2$, respectively;

$M^{II}FX\cdot aM^{I}X'$: $xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0\leqq a\leqq 4.0$ and $0<x\leqq 0.2$, respectively;

$M^{I}X$: xBi, in which $M^{I}$ is at least one alkali metal selected from the group consisting of Rb and Cs; X is at least one halogen selected from the group consisting of Cl, Br and I; and x is a number satisfying the condition of $0<x\leqq 0.2$; and alkali metal halide phosphors.

The $M^{II}X_2\cdot aM^{II}X'_2:xEu^{2+}$ phosphor may contain the following additives in the following amount per 1 mol of $M^{II}X_2\cdot aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b\leqq 10.0$;

$bKX''\cdot cMgX'''_2\cdot dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0\leqq b\leqq 2.0$, $0\leqq c\leqq 2.0$, $0\leqq d\leqq 2.0$ and $2\times 10^{-5}\leqq b+c+d$;

yB, in which y is a number satisfying the condition of $2\times 10^{-4}\leqq y\leqq 2\times 10^{-1}$;

bA, in which A is at least one oxide selected from the group consisting of $SiO_2$ and $P_2O_5$; and b is a number satisfying the condition of $10^{-4}\leqq b\leqq 2\times 10^{-1}$;

bSiO, in which b is a number satisfying the condition of $0<b\leqq 3\times 10^{-}$;

$bSnX''_2$, in which X'' is at least one halogen selected from the group consisting of F, Cl, Br and I; and b is a number satisfying the condition of $0<b\leqq 10^{-3}$;

$bCsX''\cdot cSnX'''_2$, in which each of X'' and X''' is at least one halogen selected from the group consisting of F, Cl, Br and I; and b and c are numbers satisfying the conditions of $0<b\leqq 10.0$ and $10^{-6}\leqq c\leqq 2\times 10^{-2}$, respectively; and $bCsX''\cdot yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times 10^{-1}$, respectively.

Among these above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the panel of the invention. Any other phosphors can be also employed, provided that the phosphor gives stimulated emission when excited with stimulating rays after exposure to a radiation.

Examples of the binder to be contained in the stimulable phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, polyurethane, a mixture of nitrocellulose and linear polyester, and a mixture of nitrocellulose and polyalkyl (meth)acrylate. These binders may be crosslinked with a crosslinking agent.

The stimulable phosphor layer can be formed on the support, for instance, by the following procedure.

In the first place, the above-described stimulable phosphor and binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the stimulable phosphor in the coating dispersion may be determined according to the characteristics of the aimed radiation image storage panel, the nature of the phosphor employed, etc. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a stimulable phosphor layer. The thickness of the stimulable phosphor layer varies depending upon the characteristics of the aimed radiation image storage panel, the nature of the phosphor, the ratio between the binder and the phosphor, etc. Generally, the thickness of the stimulable phosphor layer is within the range of from 20 μm to 1 mm, and preferably from 50 to 500 μm.

The stimulable phosphor layer can be provided on the support by processes other than that given in the above. For instance, the phosphor layer is initially prepared on a sheet (i.e., false support) such as a glass plate, metal plate or plastic sheet using the aformentioned coating dispersion and then thus prepared phosphor layer is superposed on the support by pressing or using an adhesive agent. Otherwise, the stimulable phosphor layer can be formed on the support by molding a powdery stimulable phosphor or a dispersion containing both of the phosphor particles and binder in the form of a sheet, sintering the molded sheet to give a stimulable phosphor layer, and combining the sintered phosphor layer and the support using an adhesive. In this case, the relative density of the phosphor layer can be increased to more than 70%, whereby the quality of an image (e.g., sharpness) provided by the resulting panel can be prominently enhanced. Alternatively, the phosphor layer can be directly formed on the support through a vacuum deposition using the stimulable phosphor.

The stimulable phosphor layer may contain the electroconductive zinc oxide whisker according to the invention. In this case, the electroconductive zinc oxide whisker is added to the solvent together with the stimulable phosphor, and they are mixed to prepare a coating dispersion. Using the obtained coating dispersion, a stimulable phosphor layer is formed on the support in the same manner as described above. The amount of the electroconductive zinc oxide whisker to be contained in the phosphor layer varies depending on the amount of the stimulable phosphor, the thickness of the phosphor layer, etc. Generally, the amount of the electroconductive zinc oxide whisker is in the range of 1 to 50% by weight, preferably 5 to 20% by weight, based on the amount of the stimulable phosphor.

The phosphor layer containing the electroconductive zinc oxide whisker preferably has a surface resistivity of not higher than $10^{12}$ ohm.

On the surface of the stimulable phosphor layer not facing the support, a transparent protective film is provided to protect the phosphor layer from physical and chemical deterioration.

The protective film can be provided on the stimulable phosphor layer by coating the surface of the phosphor layer with a solution of a transparent polymer such as cellulose derivative (e.g. cellulose acetate or nitrocellulose), or synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The thickness of the transparent protective film is preferably in the range of approximately 0.1 to 20 μm.

The electroconductive zinc oxide whisker can be contained in a layer of adhesive for combining the protective film and the stimulable phosphor layer.

The adhesive of the adhesive layer employable in the invention can be selected from various materials conventionally used as adhesives and the aforementioned binders used in the preparation of a stimulable phosphor layer.

The formation of the adhesive layer containing the electroconductive zinc oxide whisker and the protective film can be conducted by first adding the zinc oxide whisker to the adhesive solution and well mixing to prepare a coating solution homogeneously containing the zinc oxide whisker therein, evenly applying the coating solution onto a surface of a transparent thin film (protective film) having been separately prepared, and combining the thin film and the stimulable phosphor layer with the adhesive.

The amount of the electroconductive zinc oxide whisker to be contained in the adhesive layer varies depending on the thickness of the adhesive layer, etc. Generally, the amount thereof is in the range of 1 to 50% by weight, preferably in the range of 5 to 20% by weight, based on the amount of the adhesive. The adhesive layer containing the electroconductive zinc oxide whisker preferably has a surface resistivity of not higher than $10^{12}$ ohm.

The manner of incorporation of the electroconductive zinc oxide whisker into the radiation image storage panel is by no means restricted to the above-mentioned cases, and any other cases can be also applied to the invention, provided that the zinc oxide whisker is contained in at least one portion of the radiation image storage panel. For example, a layer of the electroconductive zinc oxide whisker may be provided on a surface of the panel (surface of the support, surface of the protective film, etc.) or at any desired portion between the layers constituting the panel. In this case, the layer of the electroconductive zinc oxide whisker can be formed by adding the conductive material and a binder to an appropriate solvent and well mixing to prepare a coating solution homogeneously containing the conductive material in the binder solution, applying the coating solution onto the surface of the support or the surface of the desired layer, and drying the coated layer of the solution.

As the binder employable for the formation of the layer of the electroconductive zinc oxide whisker, there can be mentioned synthetic resins such as polyacrylic resins, polyester resins, polyurethane resins, polyvinyl acetate resins and ethylene/vinyl acetate copolymers. Most preferred are polyester resins and polyacrylic resins. The solvent for the layer of the electroconductive zinc oxide whisker can be selected from the aforementioned solvents used in the preparation of a stimulable phosphor layer.

The amount of the electroconductive zinc oxide whisker to be contained in the layer of the zinc oxide whisker is generally in the range of 1 to 50% by weight, preferably 5 to 20% by weight, based on the amount of the binder. The thickness of the layer of the electroconductive zinc oxide whisker is generally in the range of 1 to 50 μm, and the surface resistivity thereof preferably is not higher than $10^{12}$ ohm.

The radiation image storage panel of the invention may be provided with a covering on the edge portion of at least one side (side surface portion of the panel) to prevent the panel from being damaged, if desired. The covering may contain the electroconductive zinc oxide whisker.

Further, the panel of the invention may be colored with a colorant to enhance the sharpness of the resulting image, as described in U.S. Pat. No. 4,394,581. For the same purpose, the panel of the invention may contain a white pigment in the stimulable phosphor layer, as described in U.S. Pat. No. 4,350,893.

The following examples further illustrate the present invention, but these examples are understood to by no means restrict the claimed invention.

EXAMPLE 1

To polyester (Bylon 30P, tradename available from Toyobo Co., Ltd.) in dioxane was added a whisker of an electroconductive zinc oxide whisker (Panatetra, tradename available from Matsushita Industries, Co., Ltd.), and they were well mixed in a ball mill to prepare a coating dispersion for an undercoating layer (amount of zinc oxide whisker: 10 wt. % per solid content of polyester).

The coating dispersion was evenly applied onto a white polyethylene terephthalate sheet containing barium sulfate (support, thickness: 250 μm) placed horizontally on a glass plate. The application of the coating dispersion was carried out using a doctor blade. The support having a coated layer was then dried at a temperature of approx. 100° C. to form an undercoating layer having a thickness of approx. 20 μm on the support.

Independently, to a mixture of a powdery divalent europium activated barium fluorobromide ($BaFBr:0.001Eu^{2+}$) stimulable phosphor and a linear polyester resin were added successively methyl ethyl ketone and nitrocellulose (nitration degree: 11.5%), to prepare a dispersion containing the phosphor and the binder. Subsequently, tricresyl phosphate, n-butanol and methyl ethyl ketone were added to the dispersion. The mixture was sufficiently stirred by a propeller agitator to obtain a homogeneous coating dispersion having a mixing ratio of 1:20 (binder: phosphor, by weight) and a viscosity of 25–30 PS (25° C.).

The coating dispersion was evenly applied onto the surface of the undercoating layer provided on the support placed horizontally on a glass plate. The application of the coating dispersion was carried out using a doctor blade. The support having the undercoating layer and a layer of the coating dispersion was then placed in an oven and heated at a temperature gradually rising from 25° to 100° C. to dry the coated dispersion layer. Thus, a stimulable phosphor layer having a thickness of 250 μm was formed on the undercoating layer.

Subsequently, on the stimulable phosphor layer was placed a transparent polyethylene terephthalate film (thickness: 12 μm; provided with a polyester adhesive on one surface) to combine the transparent film and the phosphor layer with the adhesive.

Thus, a radiation image storage panel consisting of a support, an undercoating layer containing an electroconductive zinc oxide whisker, a stimulable phosphor layer and a transparent protective film, superposed in order, was prepared (see FIG. 1-(2)).

COMPARISON EXAMPLE 1

The procedure of Example 1 was repeated except for using an electroconductive $K_2O{\cdot}nTiO_2$ whisker which was made electroconductive by treatment with $SnO_2$ and $InO_2$ (Dentol BK 200, tradename available from Ohtsuka Chemical Co., Ltd.) instead of the electroconductive zinc oxide whisker, to prepare a radiation image storage panel consisting of a support, an undercoating layer containing electroconductive $K_2O{\cdot}nTiO_2$ whisker, a stimulable phosphor layer and a transparent protective film, superposed in order.

COMPARISON EXAMPLE 2

The procedure of Example 1 was repeated except for using powdery zinc oxide instead of the electroconductive zinc oxide whisker, to prepare a radiation image storage panel consisting of a support, an undercoating layer containing powdery zinc oxide, a stimulable phosphor layer and a transparent protective film, superposed in order.

EXAMPLE 2

To polyester (Bylon 30P, tradename available from Toyobo Co., Ltd.) in dioxane were added a whisker of an electroconductive zinc oxide whisker (Panatetra, tradename available from Matsushita Industries, Co., Ltd.) and a powdery barium fluorobromide (BaFBr, mean diameter; 2 μm). The mixture was stirred by a propeller agitator to obtain a homogeneous coating dispersion (amount of solid polyester resin content per BaFBr: 20 wt. %, and amount of zinc oxide whisker: 10 wt. % per BaFBr).

The coating dispersion was evenly applied onto a white polyethylene terephthalate sheet containing barium sulfate (support, thickness: 250 μm) placed horizontally on a glass plate. The application of the coating dispersion was carried out using a doctor blade. The support having a coated layer was then dried at a temperature of approx. 100° C. to form a light-reflecting layer having a thickness of approx. 40 μm on the support.

On the light-reflecting layer, a stimulable phosphor layer was formed in the manner as described in Example 1. Further, a protective film was arranged on the stimulable phosphor layer in the manner as described in Example 1.

Thus, a radiation image storage panel consisting of a support, a light-reflecting layer containing an electroconductive zinc oxide whisker, a stimulable phosphor layer and a transparent protective film, superposed in order, was prepared (see FIG. 1-(3)).

COMPARISON EXAMPLE 3

The procedure of Example 2 was repeated except for using an electroconductive $K_2O{\cdot}nTiO_2$ whisker which was made electroconductive by treatment with $SnO_2$ and $InO_2$ (Dentol BK 200, tradename available from Ohtsuka Chemical Co., Ltd.) instead of the electroconductive zinc oxide whisker, to prepare a radiation image storage panel consisting of a support, a light-reflecting layer containing electroconductive $K_2O{\cdot}nTiO_2$ whisker, a stimulable phosphor layer and a transparent protective film, superposed in order.

COMPARISON EXAMPLE 4

The procedure of Example 2 was repeated except for using powdery zinc oxide instead of the electroconductive zinc oxide whisker, to prepare a radiation image storage panel consisting of a support, a light-reflecting layer containing powdery zinc oxide, a stimulable phosphor layer and a transparent protective film, superposed in order.

EXAMPLE 3

To a mixture of methyl ethyl ketone and 2-propanol (1:1) were added 200 g of powdery divalent europium activated barium fluorobromoiodide ($BaFBr_{0.9}I_{0.1}{:}0.001Eu^{2+}$) stimulable phosphor, 22.5 g of polyurethane (binder, tradename: DESMOLACK TPKL-5-2625, available from Sumitomo Bayer Urethane Co., Ltd., solid content: 40%) and 1.0 g of epoxy resin (anti-yellowing agent, tradename: EPICOAT 1001, available Yuka Shell Epoxy Co., Ltd.). The resulting mixture was sufficiently stirred by a propeller agitator to obtain a homogeneous coating dispersion having a viscosity of 30 PS (25° C.).

The coating dispersion was evenly applied onto a release layer coated polyethylene terephthalate sheet (thickness: 180 μm) using a docter blade to give a coated layer. The coated layer was then heated to dryness and then removed from the sheet. Thus, a phosphor sheet was prepared.

Independently, a support having an electroconductive undercoating layer thereon was prepared in the same manner as in Example 1.

On the electroconductive undercoating layer of the support was placed the phosphor sheet under pressure of 400 kgw/cm$^2$ and at a temperature of 80° C. using a calender roll. Thus, a composite sheet comprising the support and the phosphor layer which was fused with the surface of the electroconductive undercoating layer was prepared.

Subsequently, on the fused phosphor sheet was placed a transparent polyethylene terephthalate film (thickness: 10 μm; provided with a polyester adhesive on one surface) to combine the transparent film and the phosphor sheet with the adhesive.

Thus, a radiation image storage panel consisting of a support, an undercoating layer containing an electroconductive zinc oxide whisker, a stimulable phosphor layer, and a transparent protective film, superposed in order, was prepared (see FIG. 1-(2)).

COMPARISON EXAMPLE 5

The procedure of Example 3 was repeated except for using an electroconductive $K_2O{\cdot}nTiO_2$ whisker which was made electroconductive by treatment with $SnO_2$ and $InO_2$ (Dentol BK 200, tradename available from Ohtsuka Chemical Co., Ltd.) instead of the electroconductive zinc oxide whisker, to prepare a radiation image storage panel consisting of a support, an undercoating layer containing electroconductive $K_2O{\cdot}nTiO_2$ whisker, a stimulable phosphor layer and a transparent protective film, superposed in order.

COMPARISON EXAMPLE 6

The procedure of Example 3 was repeated except for using powdery zinc oxide instead of the electroconductive zinc oxide whisker, to prepare a radiation image storage panel consisting of a support, an undercoating layer containing powdery zinc oxide, a stimulable phosphor layer and a transparent protective film, superposed in order.

EVALUATION OF RADIATION IMAGE STORAGE PANEL

The radiation image storage panels obtained in Examples 1 to 3 and Comparison Examples 1 to 6 were evaluated on (1) surface resistance, (2) transfer property, (3) occurrence of uneveness of image provided by the panel, (4) reflectance, and (5) sensitivity-sharpness (quality of image), according to the following tests.

(1) Surface resistance

Each of the supports provided with a layer containing the conductive material was cut to give a test piece (110 mm×110 mm). The test strip was placed on a circle electrode (P-601 type, produced by Kawaguchi Electric Co., Ltd.) which was combined with an insulation measuring device (EV-40 type ultra insulation measuring device, produced by Kawaguchi Electric Co., Ltd.), and applied a voltage to measure the surface resistivity (SR) of the test strip. The measurement of the surface resistivity was done under the conditions of a temperature of 23° C. and a humidity of 53% RH.

The results are set forth in Table 1.

TABLE 1

| | Layer | Surface Resistivity (ohm) |
|---|---|---|
| Example 1 | undercoating layer containing conductive zinc oxide whisker | $10^{10}$ |
| Com. Ex. 1 | undercoating layer containing conductive $K_2O.nTiO_2$ whisker | $10^{10}$ |
| Com. Ex. 2 | undercoating layer containing conductive zinc oxide powder | $>10^{14}$ |
| Example 2 | light-reflecting layer containing conductive zinc oxide whisker | $10^{12}$ |
| Com. Ex. 3 | light-reflecting layer containing conductive $K_2O.nTiO_2$ whisker | $10^{12}$ |
| Com. Ex. 4 | light-relecting layer containing conductive zinc oxide powder | $>10^{14}$ |
| Example 3 | undercoating layer containing conductive zinc oxide whisker | $10^{10}$ |
| Com. Ex. 5 | undercoating layer containing conductive $K_2O.nTiO_2$ whisker | $10^{10}$ |
| Com. Ex. 6 | undercoating layer containing conductive zinc oxide powder | $>10^{14}$ |

Remark: ">" means "higher than".

As is evident from the results set forth in Table 1, each of the layers containing an electroconductive zinc oxide whisker in the radiation image storage panels according to the present invention (Examples 1 to 3) had a surface resistivity of not higher than $10^{12}$ ohm.

Each of the known layers containing an electroconductive $K_2O{\cdot}nTiO_2$ whisker in the radiation image storage panels (Comparison Examples 1, 3 and 5) also had a surface resistivity of not higher than $10^{12}$ ohm.

In contrast, each of the known layers containing an electroconductive zinc oxide powder in the image storage panel (Comparison Example 2, 4 and 6) had a surface resistivity of higher than $10^{14}$ ohm.

(2) Transfer property

The evaluation on the transfer property of the radiation image storage panel was done by using a static electricity testing device shown in FIG. 2.

FIG. 2 is schematically illustrates a static electricity testing device. The device comprises transferring means 21, 21' and an electric potential measuring means (static charge gauge) 22. Each of the transferring means 21, 21' comprises rolls 23*a*, 23*b* made of urethane rubber, an endless belt 24 supported by the rolls and an assisting roll 25 made of phenol resin. The electric potential measuring means 22 comprises a detector 26, a voltage indicator 27 connected to the detector 26 and a recorder 28.

The evaluation was carried out by introducing the radiation image storage panel 29 into the transferring means 21, 21', subjecting the panel to the repeated transferring procedures of 100 times in the right and left directions (directions indicated by arrows in FIG. 2), then bringing the surface of the panel (protective film-side surface) into contact with the detector 26 to measure the electric potential (KV) on the surface of the panel.

The results are set forth in Table 2.

(3) Occurrence of uneveness of image

The radiation image storage panel which had been exposed to X-rays was introduced into the above-mentioned static electricity testing device (installed in a dark room), and the panel was subjected to the repeated transferring procedures of 10 times in the same manner as set forth above. Then, the panel was subjected to a read-out procedure (reproduction procedure) by the use of a radiation image reading apparatus (FCR101, produced by Fuji Photo Film Co., Ltd.), and the reproduced image was visualized on a radiographic film. The evaluation on the occurrence of uneveness of the resulting image was done by observing occurrence of a noise (i.e., static mark caused by static discharge) on the radiographic film through visual judgment. This test was conducted under the conditions of a temperature of 10° C. and a humidity of 20% RH. The results are also set forth in Table 2.

TABLE 2

| | Surface Potential (KV) | Occurrence of Noise |
|---|---|---|
| Example 1 | −0.8 | not observed |
| Com. Ex. 1 | −0.8 | not observed |
| Com. Ex. 2 | −7.0 | observed |
| Example 2 | −0.7 | not observed |
| Com. Ex. 3 | −0.7 | not observed |
| Com. Ex. 4 | −9.0 | observed |
| Example 3 | −0.8 | not observed |
| Com. Ex. 5 | −0.8 | not observed |
| Com. Ex. 6 | −7.0 | observed |

As is evident from the results set forth in Table 2, each of the radiation image storage panels containing an electroconductive zinc oxide whisker according to the invention (Examples 1 to 3) hardly showed variation of surface potential and noise even after the transferring procedure and showed high antistatic properties. Each of the known radiation image storage panels containing an electroconductive $K_2O{\cdot}nTiO_2$ whisker (Comparison Examples 1, 3 and 5) also hardly showed variation of surface potential and noise even after the transferring procedure and showed high antistatic properties.

In contrast, each of the known radiation image storage panels containing an electroconductive zinc oxide powder (Comparison Examples 2, 4 and 6) showed large variation of surface potential and a great amount of noises (which were observed in a visible image obtained using these radiation image storage panels) after the transferring procedure.

(4) Reflectance

Reflectance of the surface of the electroconductive undercoating layer or light-reflecting layer on the support of each of the radiation image storage panels (Examples 1-3 and Comparison Examples 1-6) at a wavelength of 400 nm was measured using a spectrophotometer (automatic recording spectrophotometer available from Hitachi, Inc.). The results are set forth in Table 3.

TABLE 3

| | Layer | Reflectance (%) |
|---|---|---|
| Example 1 | undercoating layer containing conductive zinc oxide whisker | 85 |
| Com. Ex. 1 | undercoating layer containing conductive $K_2O.nTiO_2$ whisker | 79 |
| Com. Ex. 2 | undercoating layer containing conductive zinc oxide powder | 84 |
| Example 2 | light-reflecting layer containing conductive zinc oxide whisker | 90 |
| Com. Ex. 3 | light-reflecting layer containing conductive $K_2O.nTiO_2$ whisker | 82 |
| Com. Ex. 4 | light-reflecting layer containing conductive zinc oxide powder | 90 |
| Example 3 | undercoating layer containing conductive zinc oxide whisker | 85 |
| Com. Ex. 5 | undercoating layer containing conductive $K_2O.nTiO_2$ whisker | 79 |
| Com. Ex. 6 | undercoating layer containing | 84 |

TABLE 3-continued

| Layer | Reflectance (%) |
| --- | --- |
| conductive zinc oxide powder | |

As is apparent from the results seen in Table 3, each of the known supports having the electroconductive $K_2O{\cdot}nTiO_2$ whisker-containing layer (Comparison Examples 1, 3 and 5) showed low reflectance.

In contrast, each of the supports having the electroconductive zinc oxide whisker-containing layer according to the invention (Examples 1-3) and each of the known supports having the electroconductive zinc oxide powder-containing layer (Comparison Examples 2, 4 and 6) showed favorably high reflectance.

(5) Sensitivity-Sharpness (Image Quality)

1) Sensitivity:

The radiation image storage panel was exposed to X-rays at voltage of 80 KVp and subsequently scanned with a He-Ne laser beam (wavelength: 632.8 nm) to excite the phosphor particles contained in the panel. Luminance of light emitted by the phosphor layer of the panel was detected. Relative values of the luminance correspond to relative values of sensitivity.

2) Sharpness:

The radiation image storage panel was exposed to X-rays at voltage of 80 KVp through MTF chart and subsequently scanned with a He-Ne laser beam (wavelength: 632.8 nm) to excite the phosphor particles contained in the panel. The light emitted by the phosphor layer of the panel was detected and converted to electric signals by means of a photosensor (photosensor having spectral sensitivity of type S-5). The electric signal were reproduced by an image reproducing apparatus to obtain a radiation image of the MTF chart as a visible image on a display apparatus, and the modulation transfer function (MTF) value of the visible image was determined. The MTF value was given as a value (%) at the spacial frequency of 2 cycle/mm.

Figure 4:
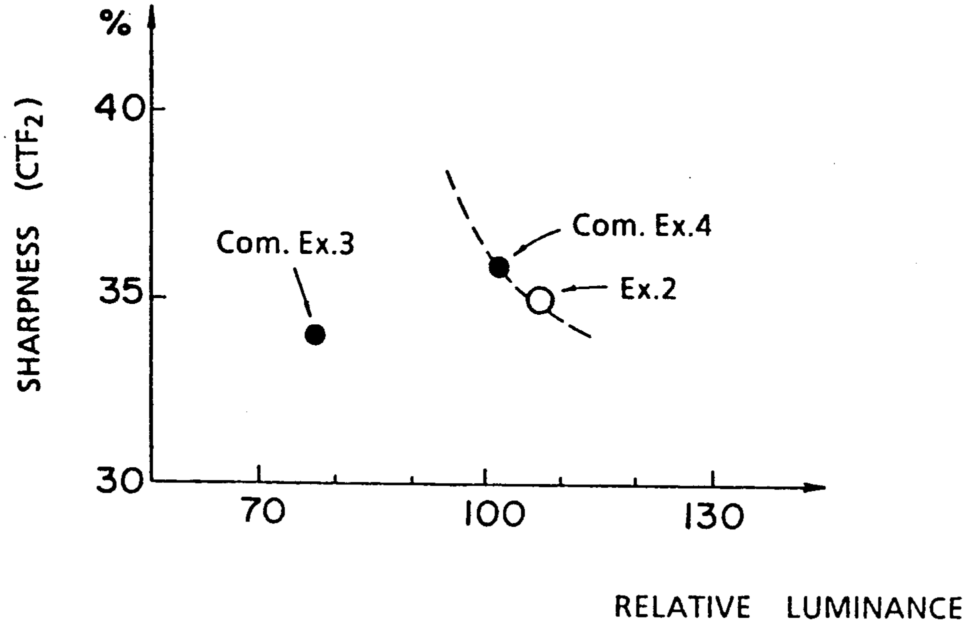
Figure 5:
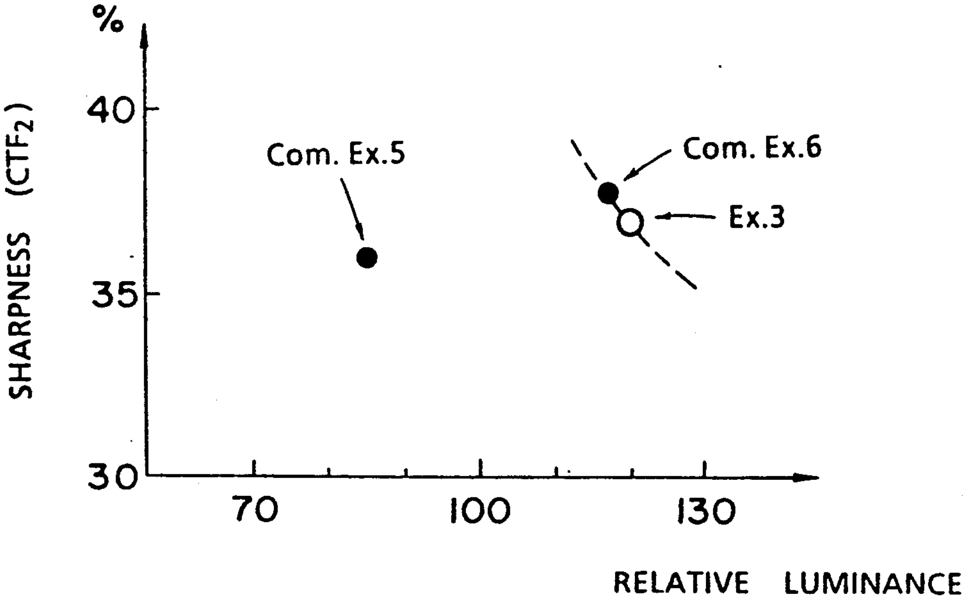

The results are graphically shown in FIGS. 3-5. Each graph indicates relationship between relative luminance given by the radiation image storage panel and sharpness of the obtained radiation image.

The results of FIGS. 3-5 indicate that the radiation image storage panels of the invention (Examples 1-3) and the known radiation image storage panels having the electroconductive zinc oxide powder-containing layer (Comparison Examples 2, 4 and 6) show prominently higher luminance (that is, prominently higher sensitivity) than the known radiation image storage panels having the electroconductive $K_2O{\cdot}nTiO_2$ whisker-containing layer (Comparison Examples 1, 3 and 5) do, at the same sharpness basis. In other words, the former radiation image storage panels show prominently higher sharpness than the latter radiation image storage panels do, at the same sensitivity basis.

We claim:

1. A radiation image storage panel with improved sensitivity, sharpness and antistatic properties comprising a support made of a plastic film or a paper material, each containing a white pigment, and a stimulable phosphor layer on said support, wherein an electro-conductive zinc oxide whisker with an average diameter in the range of 0.3 to 3.0 μm and an average length in the range of 3 to 150 μm is contained in at least a portion of said radiation image storage panel.

2. The radiation image storage panel as defined in claim 1, wherein the electroconductive zinc oxide whisker is contained in a subbing layer of a resin material in such an amount that the subbing layer shows a surface resistivity of not higher than $10^{12}$ ohm, said subbing layer being provided between the support and the stimulable phosphor layer.

3. The radiation image storage panel as defined in claim 2, wherein the electroconductive zinc oxide whisker is contained in the subbing layer in an amount of 1-50 weight % of the resin material.

4. The radiation image storage panel as defined in claim 1, wherein the electro-conductive zinc oxide whisker is contained in a light-reflecting layer having a light-reflecting material therein in such an amount that the light-reflecting layer shows a surface resistivity of not higher than $10^{12}$ ohm, said light-reflecting layer being provided between the support and the stimulable phosphor layer.

5. The radiation image storage panel as defined in claim 4, wherein the electroconductive zinc oxide whisker is contained in the light-reflecting layer in an amount of 1-50 weight % of the light-reflecting material.

* * * * *